United States Patent Office 3,212,971
Patented Oct. 19, 1965

3,212,971
3-AMINOALKOXY SUBSTITUTED AROMATIC STEROIDS, THEIR PROCESS OF PREPARATION AND THEIR USE
André Allais, Paris, and Michel Paturet, Sucy-en-Brie, France, assignors to Roussel - UCLAF S.A., Paris, France, a corporation of France
No Drawing. Filed July 27, 1962, Ser. No. 213,036
Claims priority, application France, Aug. 11, 1961, 870,686
19 Claims. (Cl. 167—65)

This invention relates to aromatic steroids of the estrane and lumiestrane series substituted in the 3-position with an aminoalkoxy group, their process of preparation and their use. More particularly, this invention relates to steroids of the estrane and lumiestrane series whose A, B and C rings correspond to the following formula:

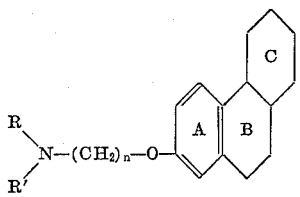

in which R and R' are selected from the group consisting of the same alkyl having 1 to 6 carbon atoms, and taken together the remainder of a carbon ring or a heterocyclic ring having 4 to 5 carbon atoms, and $n$ designates an integer between 2 and 5. The D ring of these compounds can have a double bond or various substituents, such as hydroxyl groups, acyloxyl groups and keto groups in the 16- and 17-positions. The angular methyl in the 13-position can be oriented in either the $\beta$- or in the $\alpha$-position. Their pharmacologically compatible salts are also included. The invention, however, excludes 3-($\beta$-diethylaminoethoxy)-$\Delta^{1,3,5(10)}$-estratrien-17-one.

The compounds of the invention possess useful pharmacodynamic properties. Thus they are distinguished by a considerable antilipemic activity all while being unexpectedly practically devoid of an estrogenic activity.

It is an object of the present invention to obtain a compound selected from the group consisting of (A) steroids of the formula:

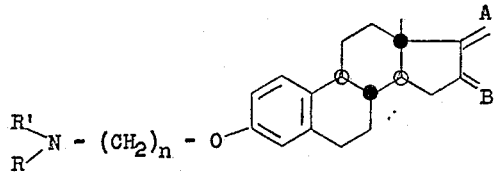

and (B) steroids of the formula:

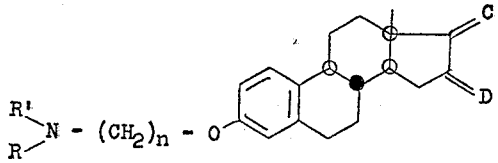

wherein R and R' are selected from the group consisting of alkyl of from 1 to 6 carbon atoms, and when taken together, alkylene of from 4 to 5 carbon atoms and ethyloxyethylene; $n$ designates an integer from 2 to 5; a represents a member selected from the group consisting of

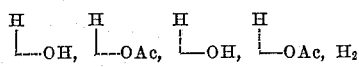

and together with B, one hydrogen and a double bond; B represents a member selected from the group consisting of

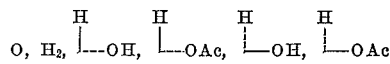

and together with A, one hydrogen and a double bond; C and D represent members selected from the group consisting of

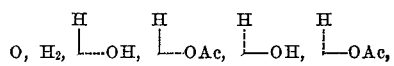

and, when taken together, a double bond and two hydrogens; Ac represents the acyl groups of a hydrocarbon carboxylic acid having from 1 to 18 carbon atoms; and (C) their pharmaceutically acceptable acid addition salts.

Another object of the invention is to obtain therapeutic compositions comprising (1) as a therapeutic component a compound selected from the group consisting of (A) steroids of the formula:

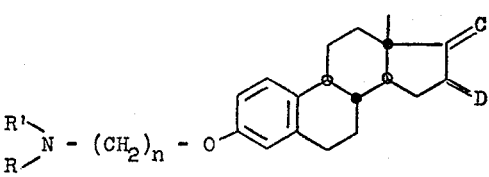

and (B) steroids of the formula:

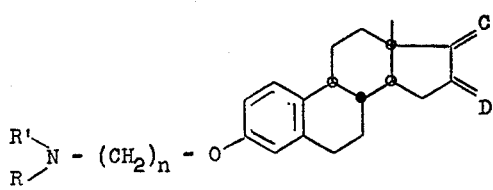

wherein R and R' are selected from the group consisting of alkyl of from 1 to 6 carbon atoms, and when taken together, alkylene of from 4 to 5 carbon atoms and ethyloxyethylene; $n$ designates an integer from 2 to 5; C and D represent members selected from the group consisting of

and when taken together a double bond and two hydrogens; Ac represents the acyl group of a hydrocarbon carboxylic acid having from 1 to 18 carbon atoms; and (C) their pharmaceutically acceptable acid addition salts; and (2) a non-toxic excipient.

A further object of the invention is the development of a process for the obtention of the above aromatic steroids of the estrane and lumiestrane series substituted in the 3-position with an aminoalkoxy group.

A still further object of the invention is the development of a process for the treatment of alimentary lipemia and hypercholesterolemia which comprises treatment with a dose of from about 2 to about 20 milligrams per day of a therapeutic compound selected from the group consisting of (A) steroids of the formula:

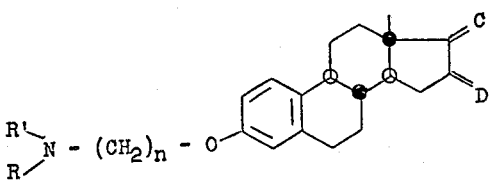

and (B) steroids of the formula:

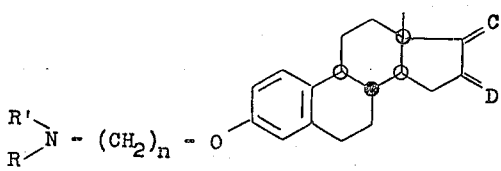

wherein R and R' are selected from the group consisting of alkyl of from 1 to 6 carbon atoms, and when taken together, alkylene of from 4 to 5 carbon atoms and ethyloxyethylene; n designates an integer from 2 to 5; C and D represent members selected from the group consisting of

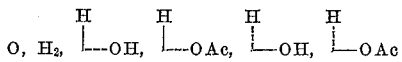

and when taken together a double bond and two hydrogens; Ac represents the acyl group of a hydrocarbon carboxylic acid having from 1 to 18 carbon atoms; and (C) their pharmaceutically acceptable acid addition salts.

Another object of the invention is the obtention, from among the class of aromatic steroids of the estrane and lumiestrane series substituted in the 3-position with an aminoalkoxy group, of the preferred compounds:

(a) 3-($\beta$-dimethylaminoethoxy)-$\Delta^{1,3,5(10)}$-estratrien-17-one,
(b) 3-($\beta$-diethylaminoethoxy)-$\Delta^{1,3,5(10)}$-estratrien-17$\alpha$-ol,
(c) 3-($\beta$-diethylaminoethoxy)-$\Delta^{1,3,5(10)}$-estratrien-16-one,
(d) 3-($\beta$-diethylaminoethoxy)-$\Delta^{1,3,5(10)}$-estratriene,
(e) 3-($\beta$-diethylaminoethoxy)-$\Delta^{1,3,5(10),16}$-estratetraene,
(f) 3-($\gamma$-diethylaminopropoxy)-$\Delta^{1,3,5(10)}$-estratrien-17-one,
(g) 3-($\gamma$-diethylaminopropoxy)-$\Delta^{1,3,5(10)}$-estratriene,
(h) 3-($\beta$-N-morpholinoethoxy)-$\Delta^{1,3,5(10)}$-estratriene,
(i) 3-($\beta$-N-piperidinoethoxy)-$\Delta^{1,3,5(10)}$-estratriene,
(j) 3-($\beta$-N-piperidinoethoxy)-$\Delta^{1,3,5(10)}$-estratrien-17-one,
(k) 3-($\beta$-N-morpholinoethoxy)-$\Delta^{1,3,5(10)}$-estratrien-17-one,
(l) 3-($\beta$-diethylaminoethoxy)-$\Delta^{1,3,5(10)}$-lumi-estratrien-17-one.

These and other objects of the invention will become more apparent as the description thereof proceeds.

It has been found that certain aromatic steroids of the estrane and lumiestrane series substituted in the 3-position with an aminoalkoxy group are excellent therapeutic compounds for the treatment of alimentary lipemia and hypercholesterolemia since they are almost devoid of estrogenic effect. Among these compounds are compounds selected from the group consisting of (A) steroids of the formula:

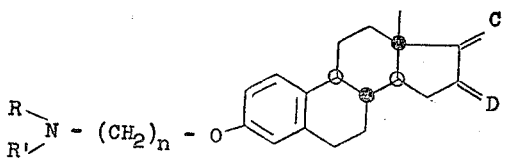

and (B) steroids of the formula:

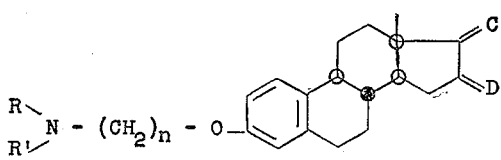

wherein R and R' are selected from the group consisting of alkyl of from 1 to 6 carbon atoms, preferably ethyl and methyl, and when taken together, alkylene of from 4 to 5 carbon atoms and ethyloxyethylene; n designates an integer from 2 to 5, preferably 2 or 3; C and D represent members selected from the group consisting of

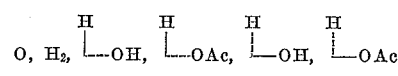

and when taken together, a double bond and two hydrogens, preferably

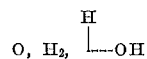

and the double bond and two hydrogens; Ac represents the acyl group of a hydrocarbon carboxylic acid having from 1 to 18 carbon atoms, preferably a hydrocarbon carboxylic acid free of acetylenic unsaturation having from 2 to 8 carbon atoms, and (C) their pharmaceutically acceptable acid addition salts. These acid addition salts are preferably the hydrochloride and the nitrate phosphate, sulfate, citrate tartrate, although other acids may be employed.

The products making the class defined above are all new compounds except 3 - ($\beta$ - diethylaminoethoxy)-$\Delta^{1,3,5(10)}$-estratrien-17-one which is described by Bergel et al. (Biochem. J. 32, 2145, 1938). This compound is also endowed with similar therapeutic properties, the discovery of which makes part of the present invention.

The invention equally extends to the process of preparation of these compounds. The said process consists essentially in that a compound of the formula:

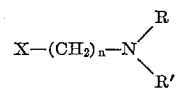

in which X designates a halogen atom selected from the group consisting of chlorine, bromine and iodine, preferably chlorine, and R and R' and n have the above noted significance, is made to react on a steroid containing in the aromatic A ring a hydroxyl group in the 3-position; the B, C and D rings have the above noted significance.

The reaction is conducted in a lower alkanol in the presence of an alkali metal lower alkanolate corresponding to the lower alkanol at about room temperature.

An advantageous method of execution of the invention consists in using a $\beta$- or $\gamma$-halogenated amine derivative, preferably the chlorinated product and operating in a methanolic media in the presence of sodium methanolate.

The aromatic steroids of the estrane and lumiestrane series substituted in the 3-position with an aminoalkoxy group, as indicated above, are endowed with useful pharmacological properties. Due to their antilipemic and hypocholesterolemic action, they can be used for the treatment of alimentary lipemia, hypercholesterolemia, the prevention of atheromatosis and of illness which result therefrom.

These compounds and their salts can be utilized orally, transcutaneously or rectally. They can be prepared in the form of injectable solutions, in the form of injectable suspensions as prepared in ampules or multiple dose flacons, in the form of tablets, and in the form of suppositories. Solubilizing agents, binding agents, lubricants and other adjuvants such as sugar, lactose, alcohol, chloroform, trichlorethylene, sorbitol, talc, amidon, pectine, gelatin, gum arabic, methyl cellulose, the sodium salt of carboxymethyl cellulose, yeast extracts, agar-agar, calcium, sulfate and calcium carbonate, kaolin, stearic acid, magnesium stearate etc., may be used in order to prepare tablets, lozenges and other solid forms of administration.

The amount of active compound in these compositions can be varied from 5 to 80% by weight, but it is a well known requirement that the active compound should be present in a sufficient amount in order that a convenient dosage can be assured of a unitary dose.

The useful dosology is controlled between 10 and 100 milligrams per day in the adult as a function of the method of administration. The pharmaceutical forms such as injectable solutes or suspensions, tablets or suppositories are prepared according to the usual processes.

The following examples illustrate the invention without, however, limiting it. Other expedients known to those skilled in the art may obviously be employed.

EXAMPLE I

*Preparation of 3-(β-diethylaminoethoxy)-$\Delta^{1,3,5(10)}$-estratriene*

5 gm. of $\Delta^{1,3,5(10)}$-estratrien-3-ol, 100 cc. of benzene and 20 cc. of methanol were successively introduced into a 3-necked balloon flask. After the contents had dissolved, 10 cc. of a solution of sodium methylate in methanol containing 11 gm. of sodium methylate per 100 cc. were added in one single amount. Next, 3 gm. of β-diethylaminoethyl chloride in solution in 10 cc. of benzene were added drop by drop to this solution.

10 minutes after the end of this addition, an abundant precipitate of sodium chloride appeared. The reaction mixture was allowed to stand at room temperature for a period of 14 hours. The solution was then filtered. The filtrate was concentrated to dryness under vacuum. The residue was redissolved in 50 cc. of methylene chloride. The methylene chloride solution was washed with N hydrochloric acid, then with 2 N sodium hydroxide and finally with water until the wash water was neutral. The methylene chloride phase was dried over sodium sulfate, filtered and brought to dryness under vacuum. 6.4 gm. of a yellow oil was thus obtained, being a yield of 95%.

This oil was dissolved in 70 cc. of ether. A current of gaseous hydrochloric acid was allowed to bubble into this solution until a pH of 3 to 4 was reached. The acidified mixture was filtered in order to recover the precipitate formed, and the precipitate was washed with ether. 6 gm. of the hydrochloride of 3-(β-diethylaminoethoxy)-$\Delta^{1,3,5(10)}$-estratriene were thus obtained, being a yield of 78.5%. Its melting point was 188° C.±1° C. and its specific rotation $[\alpha]_D^{20} = +57.5°$ (c.=0.5% in ethanol). It could be recrystallized from ethanol by heating and cooling. Its melting point remained unchanged.

The hydrochloride of 3-(β-diethylaminoethoxy)-$\Delta^{1,3,5(10)}$-estratriene occurred in the form of a colorless solid compound crystallized in needles. It was soluble in acetone, alcohol, and chloroform, slightly soluble in hot water, and insoluble in ether and benzene.

Analysis ($C_{24}H_{38}ONCl$): Molecular weight=392.00. Calculated: C, 73.53%; H, 9.77%; N, 3.57%; Cl, 9.04%. Found: C, 73.3%; H, 9.8%; N, 3.5%; Cl, 9.1%.

This compound is not described in the literature.

The starting product, $\Delta^{1,3,5(10)}$-estratrien-3-ol, is obtained according to the process described by Pearlman, J. Biol. Chem., 130, 43 (1939).

In order to obtain the free base, the 3-(β-diethylaminoethoxy)-$\Delta^{1,3,5(10)}$-estratriene, 1 gm. of the hydrochloride of 3-(β-diethylaminoethoxy)-$\Delta^{1,3,5(10)}$-estratriene was dissolved in 15 cc. of water. Ammonia solution was added until a pH of 8 was obtained. The mixture was allowed to stand for a period of 12 hours at room temperature. The reaction solution was next filtered and the filter cake was washed with water until the wash water was neutral. 0.800 gm. (yield 90%) of pure 3-(β-diethylaminoethoxy)-$\Delta^{1,3,5(10)}$-estratriene were obtained after drying under vacuum.

3-(β-diethylaminoethoxy)-$\Delta^{1,3,5(10)}$-estratriene occured in the form of a solid colorless compound, crystallized in microcrystals. It was soluble in acetone, alcohol, ether, benzene, chloroform, pentane, olive oil and dilute aqueous acids, and insoluble in water and dilute aqueous alkalis.

Its melting point, determined on the Kofler block, was from 25° C. to 30° C. and its specific rotation $$[\alpha]_D^{20} = +62.4° \quad (c.=0.5\% \text{ in ethanol})$$

Analysis: ($C_{24}H_{37}ON$): Molecular weight=355.54. Calculated: C, 81.07%; H, 10.49%; N, 3.94%. Found: C, 81.2%; H, 10.4%; N, 4.0%.

This compound is not described in the literature.

3-(β-diethylaminoethoxy)-$\Delta^{1,3,5(10)}$-estratriene is endowed with interesting pharmacological properties. It possesses particularly in antilipemic and hypocholesterolemiant action. It can be used for the treatment of hypercholesterolemia, the prevention of atheromatosis and of illnesses which result therefrom.

3-(β-diethylaminoethoxy)-$\Delta^{1,3,5(10)}$-estratriene and its salts are used orally, transcutaneously or rectally.

They can be prepared in the form of injectable solutions, in the form of injectable suspensions as prepared in ampules or multiple dose flacons, in the form of tablets, and in the form of suppositories.

The useful dosology is controlled between 10 and 100 milligrams per day in the adult as a function of the method of administration. The pharmaceutical forms such as injectable solutes or suspensions, tablets, or suppositories are prepared according to the usual processes.

*Pharmacological study of 3-(β-diethylaminoethoxy)-$\Delta^{1,3,5(10)}$-estratriene*

(a) *Hypolipemiant and hypocholesterolemiant action.*—This test was made on castrated rats rendered strongly hyperlipemic and hypercholesterolemic by intravenous injection of a solution of Triton WR-1339 (M.D.) used at a dose of 500 mg./kg.

The product was administered orally in solution in olive oil. The total dose was administered over a period of 5 days. The fourth day, the dose of Triton WR-1339 was injected. The sixth day, the animals were sacrificed. The blood was separated and recovered over an anti-coagulant. The following determinations were made:

Total lipids in the blood,
Kunkel test to phenol,
Amount of cholesterol in the blood.

The table below gives a resume of the results obtained on lots of rats thus treated with different doses of 3-(β-diethylaminoethoxy)-$\Delta^{1,3,5(10)}$-estratriene.

TABLE 1

| Doses, mg./kg. | Kunkel test, percent | Amount of lipids, percent | Amount of cholesterol, percent |
|---|---|---|---|
| 1 | −14 | −13 | −14 |
| 2 | 0 | −15 | −17 |
| 5 | −28 | −34 | −12 |

These results are expressed as a percent change with reference to control animals having received the Triton WR-1339 but not treated with 3-(β-diethylaminoethoxy)-$\Delta^{1,3,5(10)}$-estratriene.

(b) *Determination of the estrogenic effect.*—The rats which served in the determination of the hypolipemiant effect were autopsied after sacrifice. The uterine Fallopian tubes were separated and weighed. The following variations expressed as a percent change with reference to control animals were noted.

TABLE 2

| Dose: | Weight of uterine Fallopian tubes, percent |
|---|---|
| 1 mg./kg. | −9 |
| 2 mg./kg. | −7 |
| 10 mg./kg. | +13 |
| 15 mg./kg. | +2 |
| 30 mg./kg. | +32 |

It can thus be stated that 3-(β-diethylaminoethoxy)-$\Delta^{1,3,5(10)}$-estratriene possesses a noticeable estrogenic effect only at the considerable dose of 30 mg./kg.

EXAMPLE II

*Preparation of 3-(β-diethylaminoethoxy)-$\Delta^{1,3,5(10)}$-estratrien-17α-ol*

3 gms. of estradiol-17α were dissolved in 50 cc. of methylene chloride. 25 cc. of methanol containing 0.6 gm. of sodium methylate were added. Then 2.5 gms. of β-diethylaminoethyl chloride were introduced. The reaction mixture was allowed to stand at room temperature for a period of 2 hours. Thereafter the mixture was filtered and the filtrate was evaporated to dryness under vacuum. The residue was introduced into 70 cc. of ether. 1 gm. of the insoluble starting product, which had not reacted, was eliminated by vacuum filtration. The filtrate was then acidified by the drop by drop addition of a solution of hydrochloric acid. The hydrochloride of 3-(β-diethylaminoethoxy)-$\Delta^{1,3,5(10)}$-estratrien-17α-ol precipitated. The precipitate was vacuum filtered, washed with ether and dried. 3 gms. of a white pulverulent product was obtained, being a quantitative yield if the recovered starting product is taken into consideration.

This compound is not described in the literature.

In order to obtain the free base, the product obtained was dissolved in about 60 volumes of water. Ammonia solution was added until the solution was alkaline. Thereafter, the solution was extracted with methylene chloride. The extracts were washed with water, dried and evaporated to dryness under vacuum. The residue was crystallized from hexane and supplied 2.2 gms. of a colorless product, having a melting point of 84° C. and a specific rotation $[\alpha]_D^{20}=+43.5°$ (c.=1% in chloroform). The free base of 3-(β-diethylaminoethoxy)-$\Delta^{1,3,5(10)}$-estratrien-17α-ol was soluble in the usual organic solvents such as alcohol, ether, acetone, benzene and chloroform, and insoluble in water.

Analysis ($C_{24}H_{37}O_2N$): Molecular weight=371.54. Calculated: C, 77.58%; H, 10.04%; N, 3.77%. Found: C, 77.4%; H, 9.9%; N, 3.7%.

This compound is not described in the laterature.

This compound, administered orally in a dose of 0.2 mg. daily per rat over a period of 5 days, caused a lowering of cholesterolemia of 20% and of lipemia of 25%. At a dose of 1 mg. per rat, administered subcutaneously, it manifested no estrogenic activity.

EXAMPLE III

Preparation of 3-(β-N-morpholinoethoxy)-$\Delta^{1,3,5(10)}$-estratrien-17-one 3 gms. of estrone were dissolved in 50 cc. of methylene chloride. 25 cc. of methanol containing 0.66 gm. of sodium methylate were added. Then 2.3 gm. of β-N-morpholinoethyl chloride were introduced. The reaction mixture was allowed to stand at room temperature for a period of 24 hours. Then it was filtered. The filtrate was evaporated to dryness under vacuum, and the residue was introduced into 70 cc. of ether. The solution was filtered again and 1.7 gms. of pure estrone were recovered. Dry hydrochloric acid was added to the ethereal solution until an acidic pH was obtained. The hydrochloride of 3-(β-N-morpholinoethoxy)-$\Delta^{1,3,5(10)}$-estratrien-17-one precipitated. The product was vacuum filtered, washed with ether, and 1.8 gms. of a pulverulent white product comprising the hydrochloride of 3-(β-N-morpholinoethoxy) - $\Delta^{1,3,5(10)}$ - estratrien - 17 - one was obtained.

This compound is not described in the laterature.

In order to obtain the free base, the product obtained was dissolved in 85 volumes of water. A solution of ammonia was added until an alkaline pH was obtained. The free base crystallized. The crystals were vacuum filtered. The filter cake was washed with water, dried, and 1.1 gms. of a white product, the 3-(β-N-morpholinoethoxy)-$\Delta^{1,3,5(10)}$-estratrien-17-one, having a melting point of 114° C. and a specific rotation $[\alpha]_D^{20}=+114.5°$ (c.=1% in chloroform), was obtained. The product was soluble in alcohol, ether, acetone, benzene and chloroform and insoluble in water.

Analysis ($C_{24}H_{33}O_3N$): Molecular weight=383.5. Calculated: C, 75.16%; H, 8.67%; N, 3.65%. Found: C, 75.4%; H, 8.6%; N, 3.7%.

This product is not described in the literature.

In an analogous manner, by the process which has been described in detail above, all other products of the class of compounds which are the object of the present invention can be prepared.

EXAMPLE IV

Preparation of 3-(β-N-piperidinoethoxy)-$\Delta^{1,3,5(10)}$-estratriene

Starting with 3 gm. of $\Delta^{1,3,5(10)}$-estratrien-3-ol and 1.2 gms. of β-N-piperidinoethyl chloride, the pure hydrochloride of 3-(β-N-piperidinoethoxy)-$\Delta^{1,3,5(10)}$-estratriene having a melting point of 215° C.±2° C., was obtained with a yield of 76.5%.

This compound is not described in the literature.

The free base, obtained with a yield of 80% with reference to the hydrochloride, melts at 106° C.±2° C. and has a specific rotation $[\alpha]_D^{20}=+61°$ (c.=1% in chloroform). It occurred in the form of colorless prisms. It is soluble in ethanol, ether, acetone, benzene, chloroform and olive oil. It is insoluble in water.

Analysis ($C_{25}H_{37}ON$): Molecular weight=367.55. Calculated: C, 81.69%; H, 10.15%; N, 3.81%. Found: C, 81.8%; H, 9.9%; N, 4.1%.

This compound is not described in the literature.

This compound possesses a clear antilipemic activity and is deprived of estrogenic effect at a dose of 2 mg. per rat orally.

EXAMPLE V

Preparation of 3-(γ-diethylaminopropoxy)-$\Delta^{1,3,5(10)}$-estratriene

Starting with 4 gm. of $\Delta^{1,3,5(10)}$-estratriene-3-ol and 4.7 gm. of γ-diethylaminopropyl chloride, the hydrochloride of 3 - (γ - diethylaminopropoxy)-$\Delta^{1,3,5(10)}$-estratiene was obtained with a yield of 95%. This compound was very hydroscopic.

This compound is not described in the literature.

6 gm. of the hydrochloride of 3-(γ-diethylaminopropoxy)-$\Delta^{1,3,5(10)}$-estratriene were dissolved in 30 cc. of water. The solution obtained was treated with 0.2 gm. of activated carbon black and filtered while hot. A concentrated ammonia solution was added to the solution which had been cooled to room temperature until a pH of 8–9 was reached. The reaction mixture was extracted with ether. The organic phases were combined, washed with water until neutral, dried, filtered and concentrated to dryness under vacuum. The oil formed was dissolved in about 8 cc. of hot methanol. The solution was cooled to room temperature, and a 50% solution of nitric acid was added until the pH reached 1 to 2. The mixture was iced for one hour and vacuum filtered. The crystals formed were washed with 1 cc. of iced methanol, then with ether, and dried under vacuum. The pure nitrate of 3-(γ-diethylaminopropoxy)-$\Delta^{1,3,5(10)}$-estratriene was obtained with a yield of 60%. The product had a melting point of 178° C.±1° C. and a specific rotation $[\alpha]_D^{20}=+4.9°$ (c.=1% in ethanol).

This compound formed crystals in leaflets. It was soluble in water, ethanol, acetone and chloroform. It was insoluble in ether and benzene.

Analysis ($C_{25}H_{40}N_2O_4$): Molecular weight=432.59. Calculated: C, 69.41%; H, 9.32%; N, 6.48%. Found: C, 69.6%; H, 9.0%; N, 6.6%.

This compound is not described in the literature.

The free base obtained in the course of the preparation of the nitrate of 3-(γ-diethylaminopropoxy)-$\Delta^{1,3,5(10)}$-estratriene was isolated only in an oily state.

This compound is not described in the literature.

This compound possesses a clear antilipemic activity and is deprived of estrogenic effect at a dose of 2 mg. per rat orally.

EXAMPLE VI

*Preparation of 3-($\beta$-N-morpholinoethoxy)-$\Delta^{1,3,5(10)}$-estratriene*

Starting from 2 gm. of $\Delta^{1,3,5(10)}$-estratrien-3-ol and 2.3 gm. of $\beta$-N-morpholinoethyl chloride, the hydrochloride of 3-($\beta$-N-morpholinoethoxy)-$\Delta^{1,3,5(10)}$-estratriene, a very hygroscopic product, was obtained with a yield of 100%.

This compound is not described in the literature.

The free base of 3-($\beta$-N-morpholinoethoxy)-$\Delta^{1,3,5(10)}$-estratriene, obtained with a yield of 94% with reference to the hydrochloride, melted at 98° C.$\pm$2° C. and had a specific rotation $[\alpha]_D^{20} = +61°$ (c.=1% in chloroform). The product occurred in the form of colorless prisms. It was soluble in ethanol, olive oil, ether, acetone, benzene and chloroform. It was insoluble in water.

Analysis ($C_{24}H_{35}O_2N$): Molecular weight=369.53. Calculated: C, 78.00%; H, 9.54%; N, 3.79%. Found: C, 78.1%; H, 9.3%; N, 4.0%.

This compound is not described in the literature.

This compound possesses a clear antilipemic activity and is deprived of estrogenic activity at a dose of 2 mg. per rat, orally.

EXAMPLE VII

*Preparation of 3-($\beta$-diethylaminoethoxy)-$\Delta^{1,3,5(10),16}$-estratetraene*

Starting from 3 gm. of $\Delta^{1,3,5(10),16}$-estratetraen-3-ol and 3.2 gm. of $\beta$-diethylaminoethyl chloride, the hydrochloride of 3-($\beta$-diethylaminoethoxy)-$\Delta^{1,3,5(10),16}$-estratetraene, a white pulverulent very hygroscopic product was obtained. 1.7 gm. of the starting material which had not reacted, was recovered.

This compound is not described in the literature.

The hydrochloride of 3-($\beta$-diethylaminoethoxy)-$\Delta^{1,3,5(10),16}$-estratetraene was used directly for the preparation of the free base which was obtained pure with a yield of 23% with reference to the 3-($\beta$-diethylaminoethoxy)-$\Delta^{1,3,5(10),16}$-estratetraene by adding ammonia until alkalinisation. The free base, which has a melting point of 28° C.$\pm$2° C. and a specific rotation $[\alpha]_D^{20} = +85°$ (c.=1% in chloroform) occured in the form of colorless prisms. It was soluble in acetone, benzene, chloroform, olive oil, hexane and ether. It was insoluble in water.

Analysis ($C_{24}H_{35}ON$): Molecular weight=353.53. Calculated: C, 81.53%; H, 9.98%; N, 3.96%. Found: C, 81.6%; H, 9.9%; N, 4.0%.

This compound is not described in the literature.

This compound, administered orally in a dose of 0.1 mg. per rat for a period of 22 days to rats having an artificial hypercholesterolemia caused by injection of Triton WR-1339, caused a lowering of the amount of cholesterol in the blood of 24% and of the lipemia of 18% as compared with the controls. At a dose of 1 mg. per rat, subcutaneously, it was devoid of estrogenic effect.

EXAMPLE VIII

*Preparation of 3-($\beta$-diethylaminoethoxy)-$\Delta^{1,3,5(10)}$-estratrien-16-one*

Starting from 3 gm. of $\Delta^{1,3,5(10)}$-estratrien-3-ol-16-one and 2.2 gm. of $\beta$-diethylaminoethyl chloride, the hydrochloride of 3-($\beta$-diethylaminoethoxy)-$\Delta^{1,3,5(10)}$-estratrien-16-one, a white pulverulent product having a melting point of 212° C.$\pm$5° C., was obtained having a yield of 66.5%.

This product is not described in the literature.

The free base of 3-($\beta$-diethylaminoethoxy)-$\Delta^{1,3,5(10)}$-estratrien-16-one, obtained with a yield of 49% with reference to the starting $\Delta^{1,3,5(10)}$-estratrien-3-ol-16-one, melted at 100° C.$\pm$1° C. and had a specific rotation $[\alpha]_D^{20} = -71.2°$ (c.=1% in chloroform). It occurred in the form of colorless prisms. It was soluble in acetone, benzene, chloroform, olive oil and ether. It was insoluble in water.

Analysis ($C_{24}H_{35}O_2N$): Molecular weight=369.53. Calculated: C, 78.00%; H, 9.55%; N, 3.79%. Found: C, 78.0%; H, 9.3%; N, 3.9%.

This compound is not described in the literature.

This compound, administered orally, at a dose of 0.1 mg. per rat, for a period of 22 days, to rats rendered artificially hypercholesterolemic by injection of Triton WR-1339, caused a diminution of the amount of cholesterol in the blood of 12%. At a dose of 1 mg. per rat, subcutaneously, it was devoid of estrogenic effect.

EXAMPLE IX

*Preparation of 3-($\gamma$-diethylaminopropoxy)-$\Delta^{1,3,5(10)}$-estratrien-17-one*

Starting from 5 gms. of $\Delta^{1,3,5(10)}$-estratrien-3-ol-17-one and 7 gms. of the hydrochloride of $\gamma$-diethylaminopropyl chloride, the hydrochloride of 3-($\gamma$-diethylaminopropoxy)-$\Delta^{1,3,5(10)}$-estratrien-17-one, a white pulverulent product having a melting point of 120° C., was obtained with a yield of 65%.

This compound is not described in the literature.

The free base obtained with a yield of 35% with reference to the starting $\Delta^{1,3,5(10)}$-estratrien-3-ol-17-one melted at 76° C. and had a specific rotation $[\alpha]_D^{20} = +120°$ (c.=1% in chloroform). The free base of 3-($\gamma$-diethylaminopropoxy)$\Delta^{1,3,5(10)}$-estratrien-17-one occurred in the form of colorless needles. It was soluble in acetone, benzene, chloroform, olive oil and ether. It was insoluble in water.

Analysis ($C_{25}H_{37}O_2N$): Molecular weight=383.55. Calculated: C, 78.28%; H, 9.72%; N, 3.65%. Found: C, 78.3%; H, 9.7%; N 3.9%.

This compound is not described in the literature.

EXAMPLE X

*Preparation of 3-($\beta$-N-piperidinoethoxy)-$\Delta^{1,3,5(10)}$-estratrien-17-one*

Starting from 5 gms. of —$\Delta^{1,3,5(10)}$-estratrien-3-ol-17-one and 4.1 gms. of $\beta$-N-piperidinoethyl chloride, the hydrochloride of 3-($\beta$-N-piperidinoethoxy)-$\Delta^{1,3,5(10)}$-estratrien-17-one, a white pulverulent product having a melting point of 210–215° C., was obtained with a yield of 90%.

This compound is not described in the literature.

The free base is obtained with a yield of 71% with reference to the hydrochloride. The free base of 3-($\beta$-N-piperidinoethoxy)-$\Delta^{1,3,5(10)}$-estratrien-17-one had a melting point of 118° C.$\pm$1° C. and a specific rotation $[\alpha]_D^{20} = +118°$ (c.=1% in chloroform). It occurred in the form of colorless needles. It was soluble in acetone, benzene, chloroform, olive oil and ether. It was insoluble in water.

Analysis ($C_{25}H_{35}O_2N$): Molecular weight=381.54. Calculated: C, 78.68%; H, 9.25%; N, 3.67. Found: C, 78.9%; H, 9.2%; N, 3.5%.

This compound is not described in the literature.

EXAMPLE XI

*Preparation of 3-($\beta$-diethylaminoethoxy)-$\Delta^{1,3,5(10)}$-lumi-estratrien-17-one*

Starting from 1 gm. of lumi-estrone and 1 gm. of $\beta$-diethylaminoethyl chloride, the hydrochloride of 3-($\beta$-diethylaminoethoxy)-$\Delta^{1,3,5(10)}$-lumi-estratrien-17-one was obtained in an aqueous solution which was utilized directly for the preparation of the free base. It is not described in the literature.

The free base, obtained with a yield of 36.6% with reference to the starting lumi-estrone, melted at 82° C.$\pm$2° C. and had a specific rotation $[\alpha]_D^{20} = -270°$ (c.=0.84% in chloroform). The free base of 3-($\beta$-diethylaminoethoxy)-$\Delta^{1,3,5(10)}$-lumi-estratrien-17-one occurred in the form of colorless needles. It was soluble in acetone, benzene, chloroform, olive oil and ether. It was insoluble in water.

Analysis ($C_{24}H_{35}O_2N$): Molecular weight=369.53. Calculated: C, 78.00%; H, 9.55%; N, 3.79%. Found: C, 77.9%; H, 9.6%; N, 3.9%.

This compound is not described in the literature.

This compound, administered for 23 days, orally, at a dose of 0.1 mg. per rat, to rats rendered artificially hypercholesterolemic by injection of Triton WR–1339, lowered the amount of cholesterol in the blood some 15% and the amount of lipemia some 10%. At a dose of 1 mg. subcutaneously, it was devoid of estrogenic effect.

EXAMPLE XII

*Preparation of 3-(β-dimethylaminoethoxy)-$\Delta^{1,3,5(10)}$-estratrien-17-one*

Starting from 5 gms. of estrone and 4 gms. of the hydrochloride of β-dimethylaminoethyl chloride, the hydrochloride of 3-(β-dimethylaminoethoxy)-$\Delta^{1,3,5(10)}$-estratrien-17-one, a crystallized white product having a melting point of 220° C.±2° C., was obtained with a yield of 21%.

This compound is not described in the literature.

The free base, obtained with a yield of 18% with reference to the starting estrone, melted at 112° C.±1° C. and had a specific rotation $[\alpha]_D^{20}=+133.3°$ (c.=1% in chloroform). The free base of 3-(βdimethylaminoethoxy)-$\Delta^{1,3,5(10)}$-estratrien-17-one occurred in the form of colorless needles. It was soluble in acetone, benzene, chloroform, olive oil and ether. It was insoluble in water.

Analysis ($C_{22}H_{31}O_2N$): Molecular weight=341.48. Calculated: C, 77.37%; H, 9.15%; N, 4.10%. Found: C, 77.4%; H, 8.9%; N, 3.9%.

This compound is not described in the literature.

The preceding examples are not to be construed as limiting the invention. It is evident to one skilled in the art that other known expedients may be employed without departing from the spirit of the invention or the scope of the appended claims.

We claim:

1. A compound selected from the group consisting of (A) steroids of the formula:

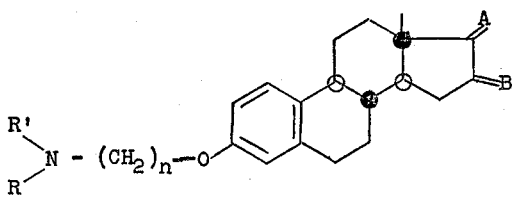

wherein R and R' are selected from the group consisting of alkyl of from 1 to 6 carbon atoms, and when taken together, alkylene of from 4 to 5 carbon atoms and ethyloxyethylene; n designates an integer from 2 to 5; A represents a member selected from the group consisting of

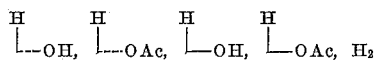

and together with B, one hydrogen and a double bond; B represents a member selected from the group consisting of

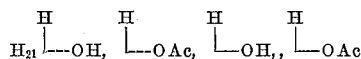

and together with A, one hydrogen and a double bond; Ac represents the acyl group of a hydrocarbon carboxylic acid having from 1 to 18 carbon atoms; and (B) their pharmaceutically acceptable acid addition salts.

2. 3-(β-diethylaminoethoxy)-$\Delta^{1,3,5(10)}$-estratrien-17α-ol.
3. The hydrochloride of 3-(β-diethylaminoethoxy)-$\Delta^{1,3,5(10)}$-estratrien-17α-ol.
4. 3-(β-diethylaminoethoxy)-$\Delta^{1,3,5(10)}$-estratriene.
5. The hydrochloride of 3-(β-diethylaminoethoxy)-$\Delta^{1,3,5(10)}$-estratriene.
6. 3-(β-diethylaminoethoxy)-$\Delta^{1,3,5(10),16}$-estratetraene.
7. The hydrochloride of 3-(β-diethylaminoethoxy)-$\Delta^{1,3,5(10),16}$-estratetraene.
8. 3 - (β-N-piperidinoethoxy)-$\Delta^{1,3,5(10)}$-estratrien - 17-one.
9. The hydrochloride of 3-(β-N-piperidinoethoxy)-$\Delta^{1,3,5(10)}$-estratrien-17-one.
10. 3-(β-N-morpholinoethoxy)-$\Delta^{1,3,5(10)}$-estratrien - 17-one.
11. The hydrochloride of 3-(β-N-morpholinoethoxy)-$\Delta^{1,3,5(10)}$-estratrien-17-one.
12. 3-(β-N-piperidinoethoxy)-$\Delta^{1,3,5(10)}$-estratriene.
13. The hydrochloride of 3-(β-N-piperidinoethoxy)-$\Delta^{1,3,5(10)}$-estratriene.
14. 3-(γ-diethylaminopropoxy)-$\Delta^{1,3,5(10)}$-estratriene.
15. The hydrochloride of 3-(γ-diethylaminopropoxy)-$\Delta^{1,3,5(10)}$-estratriene.
16. The nitrate of 3-(γ-diethylaminopropoxy)-$\Delta^{1,3,5(10)}$-estratriene.
17. 3-(β-N-morpholinoethoxy)-$\Delta^{1,3,5(10)}$-estratriene.
18. The hydrochloride of 3-(β-N-morpholinoethoxy)-$\Delta^{1,3,5(10)}$-estratriene.
19. A process for the treatment of alimentary lipemia and hypercholesterolemia which comprises administering a dose of from about 10 to about 100 milligrams per day of a therapeutic compound selected from the group consisting of (A) steroids of the formula:

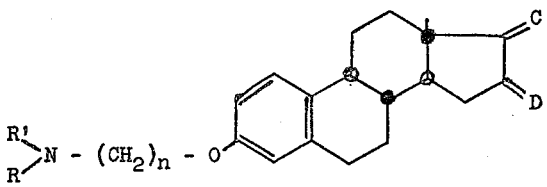

and (B) steroids of the formula:

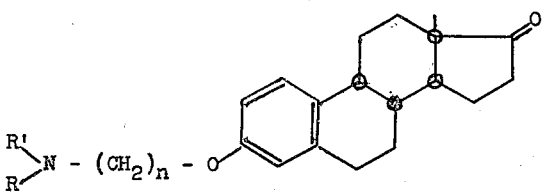

wherein R and R' are selected from the group consisting of alkyl of from 1 to 6 carbon atoms, and when taken together, alkylene of from 4 to 5 carbon atoms and ethyloxyethylene; n designates an integer from 2 to 5; C and D represent members selected from the group consisting of

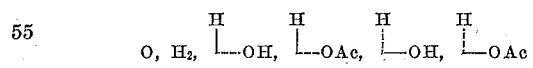

and when taken together a double bond and two hydrogens; Ac represents the acyl group of a hydrocarbon carboxylic acid having from 1 to 18 carbon atoms; and (C) their pharmaceutically acceptable acid addition salts.

References Cited by the Examiner

UNITED STATES PATENTS 3,060,204  12/61  Cantrall et al. _____ 260—397.5

OTHER REFERENCES

Bergel et al.: Biochem. J. 32, 2145–46 (1938).

LEWIS GOTTS, *Primary Examiner.*